United States Patent
Horinouchi et al.

(10) Patent No.: US 6,807,140 B2
(45) Date of Patent: Oct. 19, 2004

(54) OPTICAL PICKUP DEVICE FOR EMITTING LASER BEAMS HAVING DIFFERENT WAVELENGTHS AND OPTICAL DISK DRIVER FOR USE THEREWITH

(75) Inventors: Shogo Horinouchi, Fukuoka (JP); Hiroshi Goto, Munakata (JP); Fuminobu Furukawa, Onojo (JP)

(73) Assignee: Matsushita Electric Industrial.Co., Ltd., Osaka (JP)

( * ) Notice: Subject to any disclaimer, the term of this patent is extended or adjusted under 35 U.S.C. 154(b) by 426 days.

(21) Appl. No.: 09/978,679

(22) Filed: Oct. 18, 2001

(65) Prior Publication Data

US 2002/0051420 A1 May 2, 2002

(30) Foreign Application Priority Data

Oct. 27, 2000 (JP) ........................................ 2000-328583

(51) Int. Cl.[7] .................................................. G11B 7/00
(52) U.S. Cl. .............................. 369/112.19; 369/112.17; 369/112.21; 369/112.28; 369/112.27
(58) Field of Search ....................... 369/112.19, 112.21, 369/112.17, 112.28, 121, 44.12, 112.27

(56) References Cited

U.S. PATENT DOCUMENTS

| | | | | |
|---|---|---|---|---|
| 5,646,929 A | * | 7/1997 | Choi ........................ | 369/44.23 |
| 5,956,312 A | * | 9/1999 | Ishihara .................. | 369/112.21 |
| 6,014,361 A | * | 1/2000 | Nagashima et al. ... | 369/112.28 |
| 6,081,497 A | * | 6/2000 | Seong .................... | 369/112.17 |
| 6,301,059 B1 | * | 10/2001 | Huang et al. ............... | 359/668 |
| 6,324,150 B1 | * | 11/2001 | Ju .......................... | 369/112.19 |
| 6,567,366 B2 | * | 5/2003 | Kim et al. ............. | 369/112.21 |

FOREIGN PATENT DOCUMENTS

| | | |
|---|---|---|
| JP | 10154344 | 6/1998 |
| JP | 10283660 | 10/1998 |
| JP | 2000 099978 | 4/2000 |
| JP | 2000 163791 | 6/2000 |

* cited by examiner

*Primary Examiner*—Hoa T. Nguyen
*Assistant Examiner*—Peter Vincent Agustin
(74) *Attorney, Agent, or Firm*—Stevens, Davis, Miller & Mosher, LLP

(57) ABSTRACT

In an optical pickup device for emitting at least two laser beams suitable for respective optical recording mediums selectively operated on an optical disk driver so that a signal is read out from and/or recorded onto the selected one of the optical recording mediums, an anamorphic system is arranged to change a cross-sectional shape of one of the laser beams from an oval toward a circle between a divergence point and a confluence point along the one of the laser beam between an upstream common optical paths of the laser beams from the light beam source and a downstream common optical paths of the laser beams toward the objective lens, at which divergence point the laser beams from the upstream common optical path diverge from each other, and at which confluence point the laser beams converge into the downstream common optical path.

22 Claims, 6 Drawing Sheets

OPTICAL PICKUP DEVICE FOR EMITTING LASER BEAMS HAVING DIFFERENT WAVELENGTHS AND OPTICAL DISK DRIVER FOR USE THEREWITH

BACKGROUND OF THE INVENTION AND RELATED ART STATEMENT

The present invention relates to an optical pickup device for emitting and/or receiving a light beam to read out a signal from an optical recording medium and/or record the signal on the optical recording medium, and an optical disk driver for driving an optical recording disk while reading out the signal from the optical recording disk and/or recording the signal on the optical recording disk.

A prior art optical pickup device as disclosed by JP-A-10-154344 contains two light beam sources respectively generating light beams whose wave lengths are different from each other.

OBJECT AND SUMMARY OF THE INVENTION

An object of the present invention is to provide an optical pickup device for emitting at least two laser beams whose wave lengths are different from each other to be suitable for respective optical recording mediums either of which optical recording mediums is selectively operated on an optical disk driver so that a signal is read out from and/or recorded onto the selected one of the optical recording mediums, by which optical pickup device energies of the laser beams generated by respective laser beam sources are effectively utilized to read out the signal from and/or record the signal onto the optical recording mediums while a cross sectional shape (along an imaginary plane perpendicular to an optical axis of laser beam) of at least one of the laser beam is adjusted to become preferable for extremely-high recording density recording medium.

According to the present invention, an optical pickup device for emitting at least two laser beams whose wave lengths are different from each other to be suitable for respective optical recording mediums either of which optical recording mediums is selectively operated on an optical disk driver so that a signal is read out from and/or recorded onto the selected one of the optical recording mediums, includes a light beam source for generating the laser beams, an objective lens for focusing the laser beams on respective recording surfaces of the optical recording mediums, an upstream common optical path for passing along a common optical axis thereof the laser beams from the light beam source, a downstream common optical path for passing along a common optical axis thereof the laser beams toward the objective lens, a pair of divergence point and confluence point between the upstream and downstream common optical paths, at which divergence point the laser beams from the upstream common optical path diverge from each other, and at which confluence point the laser beams converge into the downstream common optical path, and an anamorphic system arranged between the divergence point and confluence point along one of the laser beam to change a cross-sectional shape of the one of the laser beams from an oval toward a circle.

Since the anamorphic system is arranged to change the cross-sectional shape of the one of the laser beams from the oval toward the circle between the divergence point and the confluence point along the one of the laser beam between the upstream common optical paths of the laser beams from the light beam source and the down upstream common optical paths of the laser beams toward the objective lens, at which divergence point the laser beams from the upstream common optical path diverge from each other, and at which confluence point the laser beams converge into the downstream common optical path, the cross sectional shape (along an imaginary plane perpendicular to an optical axis of laser beam) of the one of the laser beam is adjusted to become preferable for extremely-high recording density recording medium while an optical energy of another one of the laser beam is prevented from being absorbed by the anamorphic system.

If the divergence point and confluence point are prevented from being separated away from each other so that the one of the laser beams proceeds from the divergence point to the confluence point to form a closed loop on which the anamorphic system is arranged, the optical energy of the another one of the laser beam is prevented from being absorbed between the divergence point and confluence point. If the divergence point and confluence point are separated away from each other so that the one of the laser beams and the another of the laser beams proceed in parallel from the divergence point to the confluence point, an angular relationship between the upstream and downstream common optical paths can be freely set. It is preferable for effectively utilizing the optical energy of the another one of the laser beams that the anamorphic system for changing the cross-sectional shape of the one of the laser beams is prevented from changing a cross-sectional shape of another one of the laser beams.

If the divergence point includes a wavelength selective element for separating the laser beams away from each other on the basis of a difference in wavelength between the laser beams, an optical energy loss on separating the laser beams from each other between the divergence point and confluence point is minimized. It is preferable that the wavelength selective element is a wavelength selective mirror. If the wavelength selective mirror allows the one of the laser beams to be transmitted through the wavelength selective mirror so that the one of the laser beams is introduced to the anamorphic system, the one of the laser beams after passing the anamorphic system can be transmitted through the wavelength selective mirror at the divergence point to converge at the confluence point into the downstream common optical path with the another one of the laser beams, so that the one of the laser beams and the another one of the laser beams can diverge from each other and converge with each other at the same or identical point of the divergence point and confluence point prevented from being separated from each other when the single wavelength selective mirror operates as both the divergence point and confluence point for separating the laser beams from each other and converging the laser beams into the downstream common optical path.

The optical pickup device may further comprise a collimator on the upstream common optical path to convert non-parallel rays of each of the laser beams to parallel rays thereof.

The confluence point may include a wavelength selective mirror for allowing the laser beams to be introduced to the downstream common optical path, so that an optical energy loss on converging the laser beams into the downstream common optical path is minimized. The wavelength selective mirror may allow the one of the laser beams to be transmitted through the wavelength selective mirror so that the one of the laser beams from the anamorphic system is introduced to the downstream common optical path.

The device may include a one-piece optical element on which the pair of divergence point and confluence point and the anamorphic system are formed so that the one of the laser beams is prevented from passing through a gaseous atmosphere between the divergence point and the confluence point. The device may include a one-piece optical element on which the divergence point and the confluence point are formed at the same position so that another one of the laser beams is prevented from passing through a gaseous atmosphere between the divergence point and the confluence point, so that an optical energy loss and a cross sectional shape change of the another one of the laser beams are prevented between the divergence point and the confluence point.

If the device includes a single wavelength selective mirror performable as both the divergence point and the confluence point, an optical energy loss of the laser beams is restrained between the divergence point and the confluence point.

The divergence point may be exposed to a gaseous atmosphere through which the laser beams reach the divergence point. An optically transparent element may covers the divergence point so that the laser beams are allowed to reach the divergence point through the optically transparent element. If a surface of the transparent element for receiving the laser beams toward the divergence point thereon is prevented from extending perpendicularly to the laser beams proceeding into the transparent element from the light beam source, the laser beams are restrained from being reflected by the divergence point and the surface of the transparent element toward the collimator and the light beam source.

When the device has an anamorphic element on which the anamorphic system is formed, it is preferable for forming the anamorphic system that a surface of the anamorphic element for receiving the one of the laser beam to form the anamorphic system is exposed to a gaseous atmosphere so that the one of the laser beam reaches the surface of the anamorphic element through the gaseous atmosphere. If an angle between the one of the laser beam to be taken into the anamorphic element and a direction perpendicular to the surface of the anamorphic element is larger than an angle between the one of the laser beam to be returned to the surface of the anamorphic element and the direction perpendicular to the surface of the anamorphic element, the cross sectional shape of the one of the laser beams after adjusted by the anamorphic system is restrained from deteriorated when the one of the laser beams proceeds out of the anamorphic element. When the one of the laser beam proceeds through a gaseous atmosphere between the anamorphic system and each of the divergence point and the confluence point, a positional relationship amoung the anamorphic system, the divergence point and the confluence point is adjusted easily.

DETAILED DESCRIPTION OF PREFERRED EMBODIMENTS

As embodiments of the present invention, optical pickup devices for DVD and CD whose distances between recording surfaces and exposed surfaces are different from each other are described below. The DVD has a thickness of 1.2 mm, and a distance between a recording surface and an exposed surface through which a light beam proceeds to the recording surface is 0.6 mm while the DVD is adapted to be held on a reverse surface opposite to the exposed surface. The CD has a thickness of 1.2 mm, and a distance between a recording surface and an exposed surface through which a light beam proceeds to the recording surface is 1.2 mm. An optical disk driver includes a disk rotating device and a signal processor for the optical pickup device in addition to the optical pickup device.

(First Embodiment)

Figure 1:
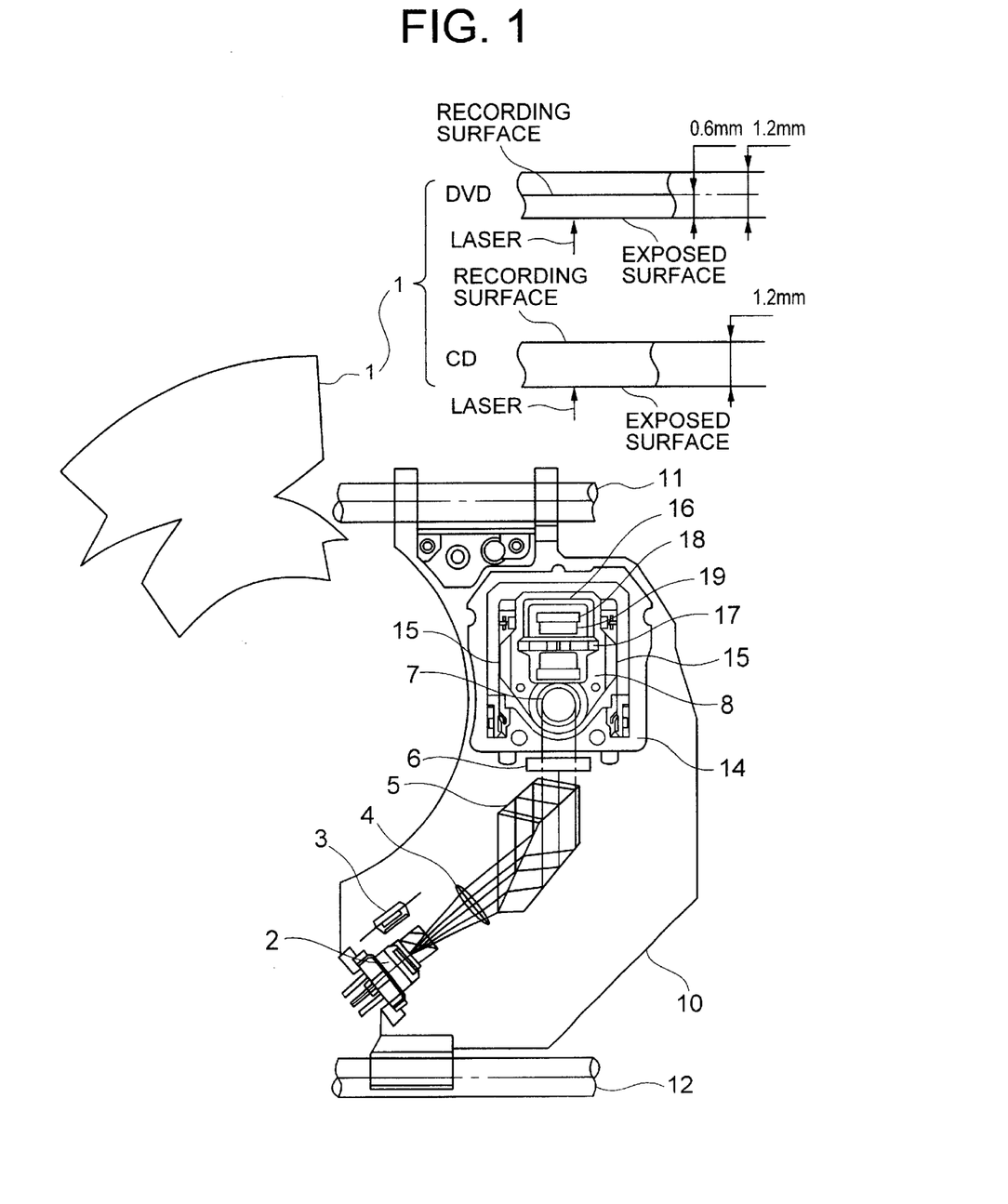
FIG. 1 is a schematic view showing a part of an optical disk driver of the invention.
Figure 2:
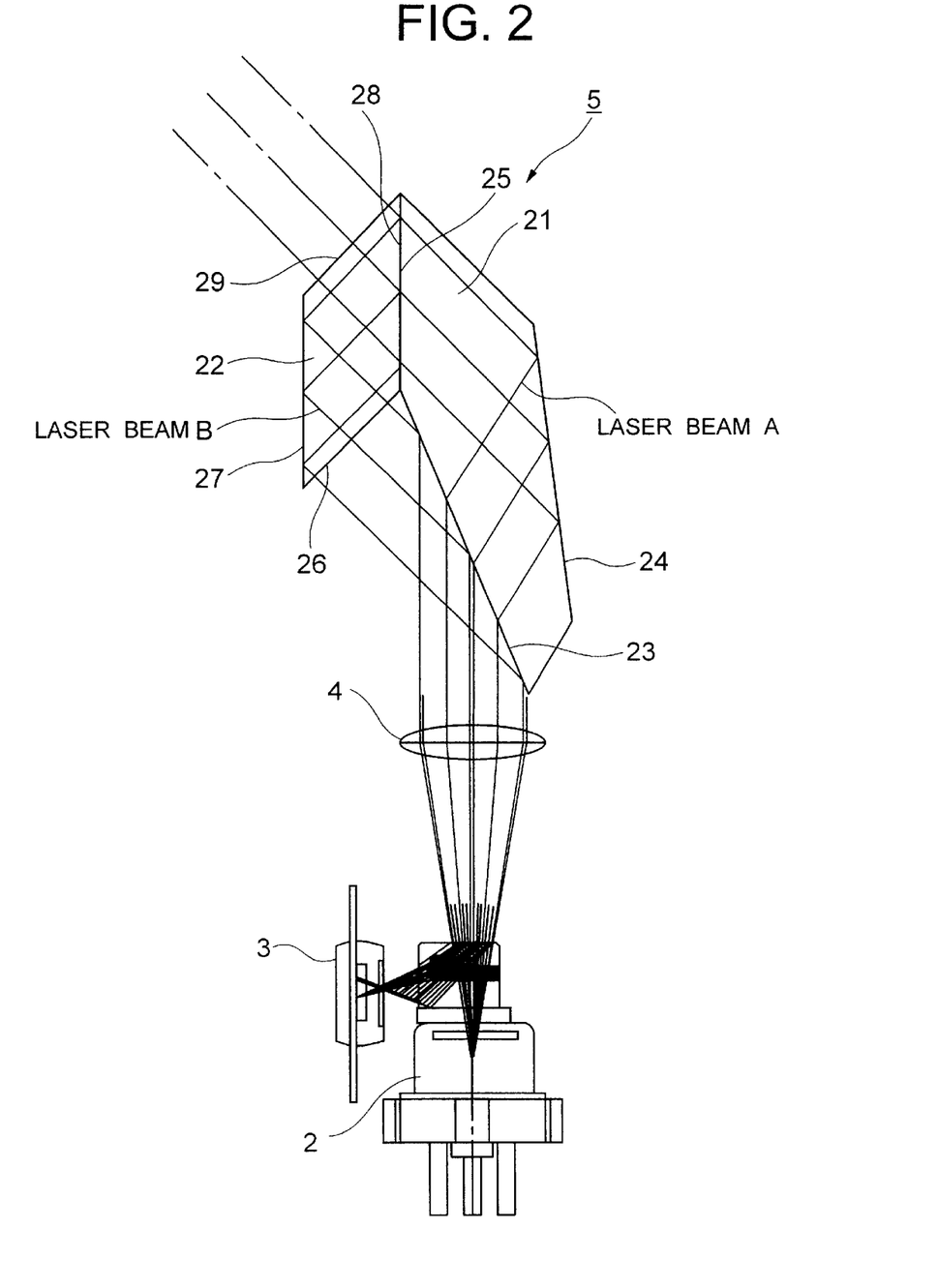
FIG. 2 is a schematic view showing an optical pickup device of the invention.

As shown in FIGS. 1 and 2, an optical recording (CD or DVD) disk 1 is supported on the optical disk driver. An optical unit 2 as the claimed first and second light beam sources generates a laser beam A of wave length 635–670 nm for recording signal on and/or reading out signal from DVD when the DVD is mounted on the optical disk driver, and a laser beam B of wave length 780 nm for recording signal on and/or reading out signal from CD when the CD is mounted on the optical disk driver. The optical unit 2 includes a first diffraction grating for generating from an original laser beam of the laser beam B the laser beam B and a pair of light beams for optical head tracking, a separator for deflecting the return light beam A or B reflected by the optical recording (CD or DVD) disk 1 to be detected by a photo-electric converter 3 from an optical path between the optical recording (CD or DVD) disk 1 and the optical unit 2, and a second diffraction grating for the return light beam A or B.

A collimator lens 4 converts non-parallel rays of the light beams A and B generated by the optical unit 2 to parallel rays thereof to be applied to the optical recording disk 1. Preferably, the collimator lens 4 is arranged as close as possible to the optical unit so that the laser beams generated by the optical unit 2 are effectively received by the collimator lens 4. A combined prism 5 receives the non-parallel rays the light beams A and B. An aperture filter 6 has a numerical aperture (NA) of 0.6 for the laser beam A so that a whole luminous flux passes through the aperture filter 6, and a numerical aperture (NA) of 0.45 for the laser beam B so that a central portion of luminous flux passes through the aperture filter 6, and a peripheral portion thereof is reflected or absorbed by the aperture filter 6.

An objective lens 7 is a special lens having focal lengths along the laser beams A and B different from each other so that laser beams A and B are focused on the respective recording surfaces whose positions are different from each other when the DVD and CD are held on the optical disk driver. The objective lens 7 is fixed to a lens holder 8 mounted on ends of wires 15 while other ends of wires 15 are fixed to a suspension holder 14 so that the lens holder 8 is movable in a focus direction perpendicular to a thickness direction of the DVD and CD and a tracking direction parallel to a radial direction of the DVD and CD. The lens holder 8 has a circular aperture in which the objective lens 7 is mounted by an adhesive, and rectangular openings into which a focus coil 16 for generating a force for urging the lens holder 8 in the focus direction and a tracking coil 17 for generating a force for urging the lens holder 8 in the tracking direction are adhered. A yoke 18 and the suspension holder 14 are fixed to a carriage 10, and a magnet 19 is mounted on the yoke 18 so that by energizing the focus coil 16 and/or the tracking coil 17, the objective lens 7 is positioned in the focus and/or tracking direction in a cooperation between the magnet 19 and the focus and/or tracking coil. When the objective lens 7 is moved largely in the radial direction of the DVD and CD, the carriage 10 slides on a support shaft 11 and a guide shaft 12.

The combined prism 5 has a first optical guide member 21 and a second optical guide member 22, both being made of high-optical-transmittance resin or glass, for example, SFL-1, BK-7 or the like (most preferably BK-7-1-1.5) of high refractive index.

The first optical guide member 21 is five-cornered and has a first separator surface 23 operating as a wavelength selective mirror as the claimed divergence point so that a substantial whole of the laser beam A is transmitted through the first separator surface 23 and a substantial whole of the laser beam B is reflected by the first separator surface 23. A cross sectional shape (along an imaginary plane perpendicular to an optical axis of the laser beam) or a Far Field Pattern of the laser beam A passing through the first separator surface 23 is changed from an oval toward a circle by a beam shaping ratio determined by an angle between a direction in which the laser beam A proceeds into the first optical guide member 21 and a direction perpendicular to the first separator surface 23 and a refraction angle of the laser beam A at the first separator surface 23, because a focal point area of the laser beam A should be small and fine-shaped in accordance with a significantly small recording pit on the DVD. Therefore, the first optical guide member 21 operates as an anamorphic prism for the laser beam A. The reflected laser beam proceeds into the second optical guide member 22. The light beam A is reflected by a reflection surface 24 and proceeds out from a first outlet surface 25 of the first optical guide member 21 operating as a wavelength selective mirror so that a substantial whole of the laser beam A is transmitted through the first outlet surface 25 and a substantial whole of the laser beam B is reflected by the first outlet surface 25. It is preferable for an angle between the direction in which the laser beam A proceeds into the first optical guide member 21 and a direction perpendicular to the first separator surface 23 to be as large as possible so that the laser beams A and B are effectively separated away from each other.

The second optical guide member 22 is four-cornered and has a second inlet surface 26 through which the laser beam B is proceeds into the second optical guide member 22, a first reflection surface 27 by which the laser beam B is reflected toward a second reflection surface 28 operating as the wavelength selective mirror as the claimed confluence point so that the substantial whole of the laser beam A is transmitted through the second reflection surface 28 and the substantial whole of the laser beam B is reflected by the second reflection surface 28, and proceeds out of the second optical guide member 22 from a second outlet surface 29 along a common axis with the laser beam A. The wavelength selective mirror may be formed on either of the first outlet surface 25 and the second reflection surface 28 adhered to each other. The laser beams A and B of parallel rays proceed from the second outlet surface 29 toward the objective lens 7 along a common optical axis while the cross sectional shape of the laser beam A is substantially circular. The laser beams A and B is deflected perpendicularly by a mirror (not shown) between the objective lens 7 and the aperture filter 6 to be directed to the objective lens 7.

(Second Embodiment)

Figure 3:
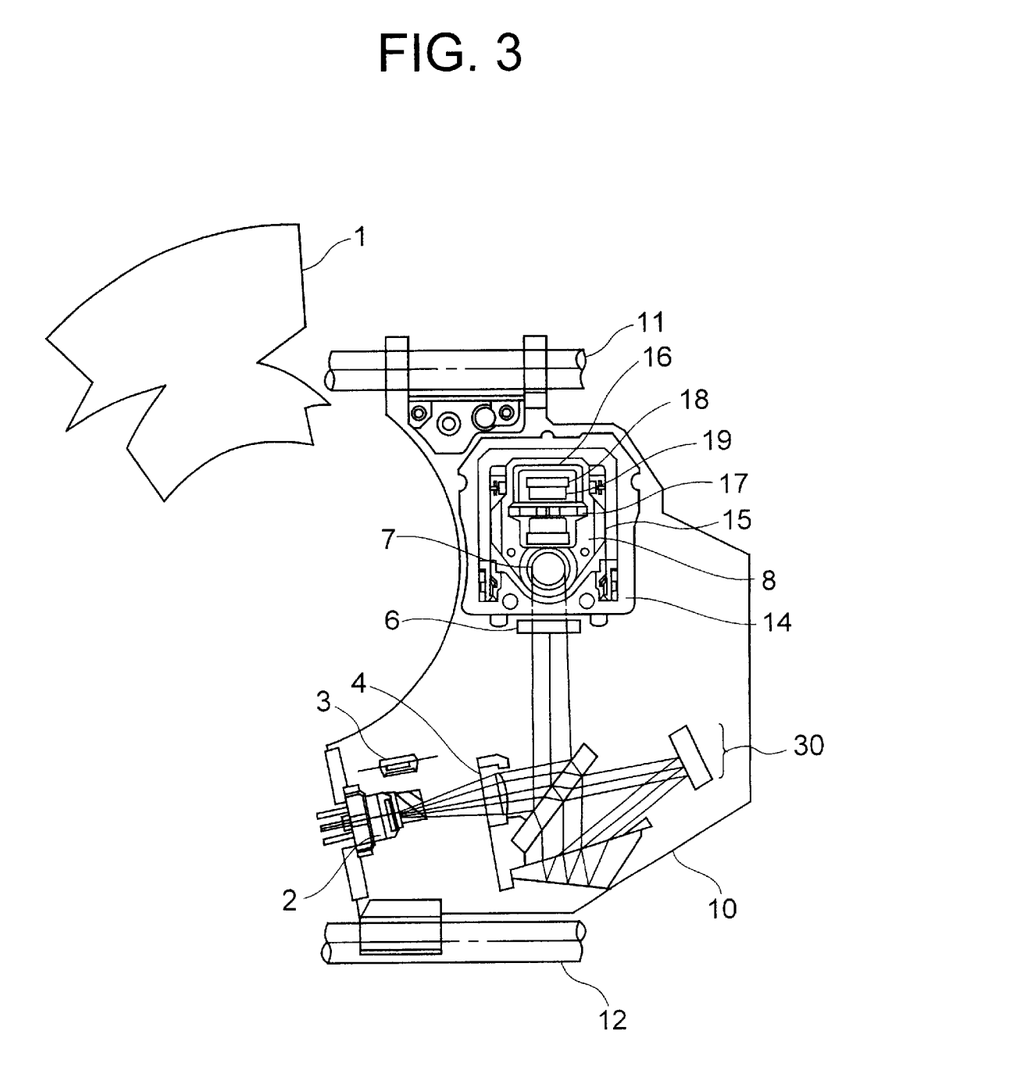
FIG. 3 is a schematic view showing a part of another optical disk driver of the invention.
Figure 4:
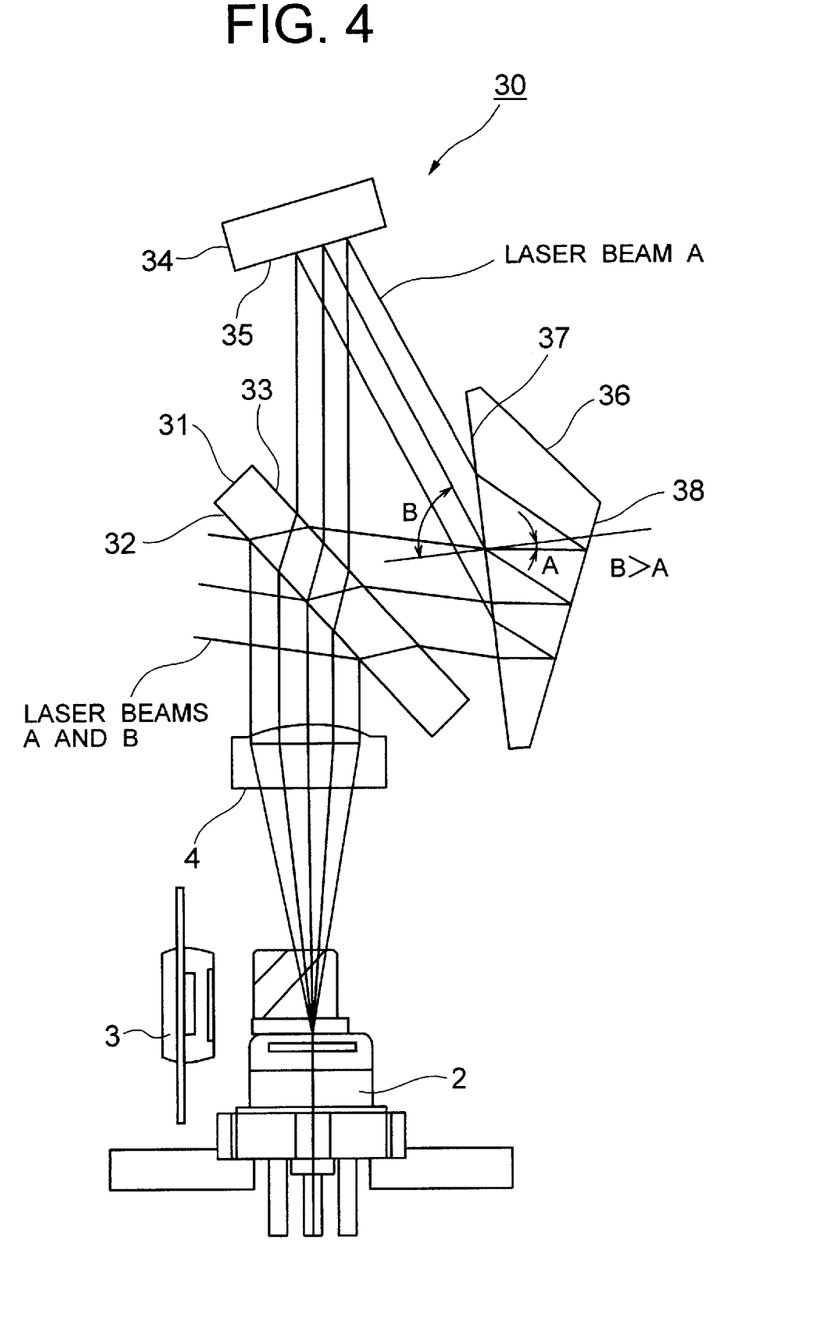
FIG. 4 is a schematic view showing another optical pickup device of the invention.

As shown in FIGS. 3 and 4, the laser beams A and B are treated in an optical system 30 between the collimator lens 4 and the objective lens 7. The optical system 30 has a first optical member 31 including parallel surfaces one of which is a first separator surface 32 operating as the wavelength selective mirror as the claimed divergence point so that a substantial whole of the laser beam A is transmitted through the first separator surface 32 and a substantial whole of the laser beam B is reflected by the first separator surface 32, and another one of which is a first outlet surface 33 through which the laser beam A proceeds to a second optical member 35 including a reflection surface 35 reflecting the laser beam A toward a third optical member 36. The third optical member 36 is substantially three-cornered and has a refraction surface 37 at which the cross sectional shape or the Far Field Pattern of the laser beam A is changed from the oval toward the circle by the beam shaping ratio determined by an angle B between a direction in which the laser beam A proceeds into the refraction surface 37 and a direction perpendicular to the refraction surface 37 and a refraction angle of the laser beam A at the refraction surface 37. Therefore, the third optical member 36 operates as an anamorphic prism for the laser beam A.

The laser beam A of circular cross section shape is reflected by a third reflection surface 38 to the refraction surface 37. Since an angle A between a direction in which the laser beam A returns to the refraction surface 37 and the direction perpendicular to the refraction surface 37 is small, the circular cross section shape of the laser beam A is kept when the laser beam A proceeds into the first optical member 31. The laser beam A proceeds out of the first optical member 31 along a common axis with the laser beam B from the first separator surface 32 operating as the wavelength selective mirror as the claimed confluence point so that the substantial whole of the laser beam A is transmitted through the first separator surface 32 and the substantial whole of the laser beam B is reflected by the first separator surface 32. The laser beams A and B of parallel rays proceed toward the objective lens 7 along a common optical axis while the cross sectional shape of the laser beam A is substantially circular. The laser beams A and B is deflected perpendicularly by a mirror (not shown) between the objective lens 7 and the aperture filter 6 to be directed to the objective lens 7.

(Third Embodiment)

Figure 5:
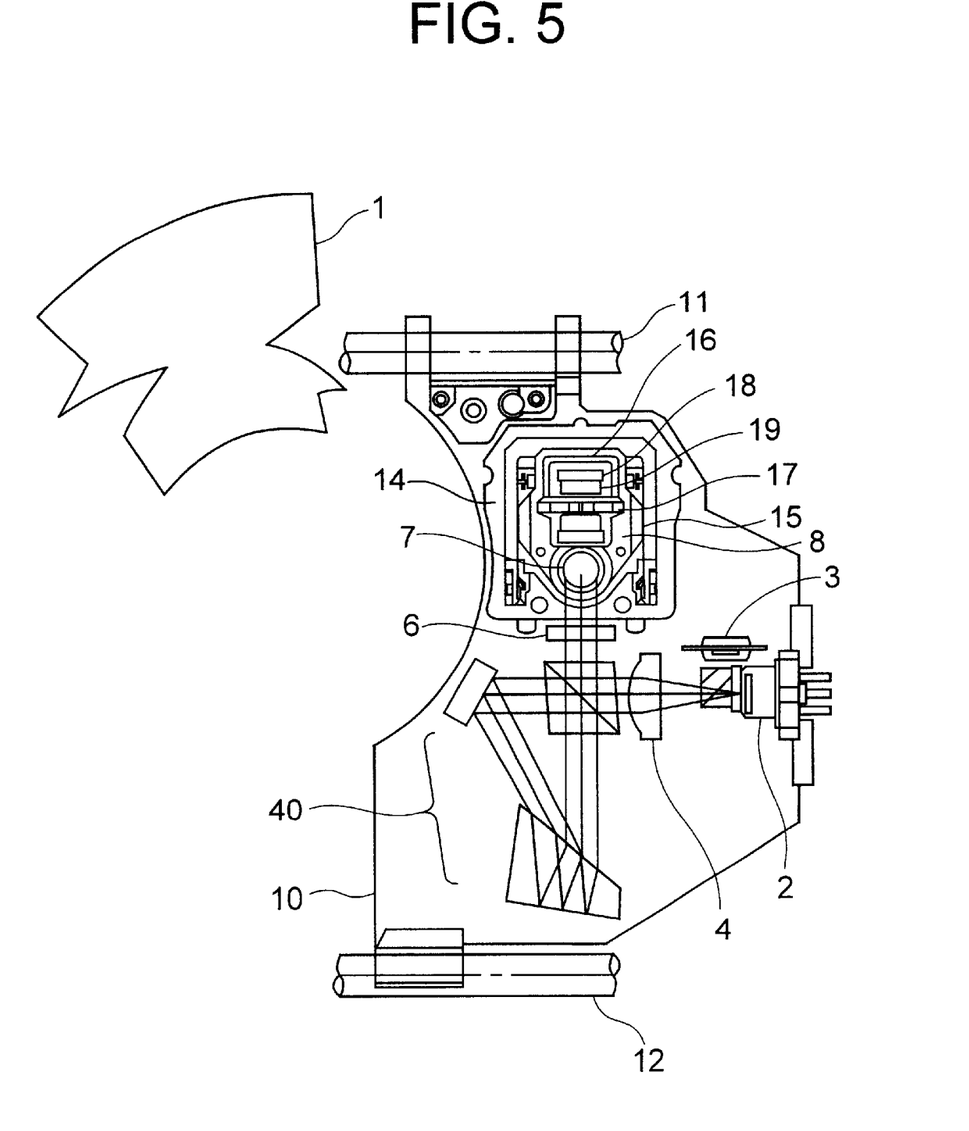
FIG. 5 is a schematic view showing a part of another optical disk driver of the invention.
Figure 6:
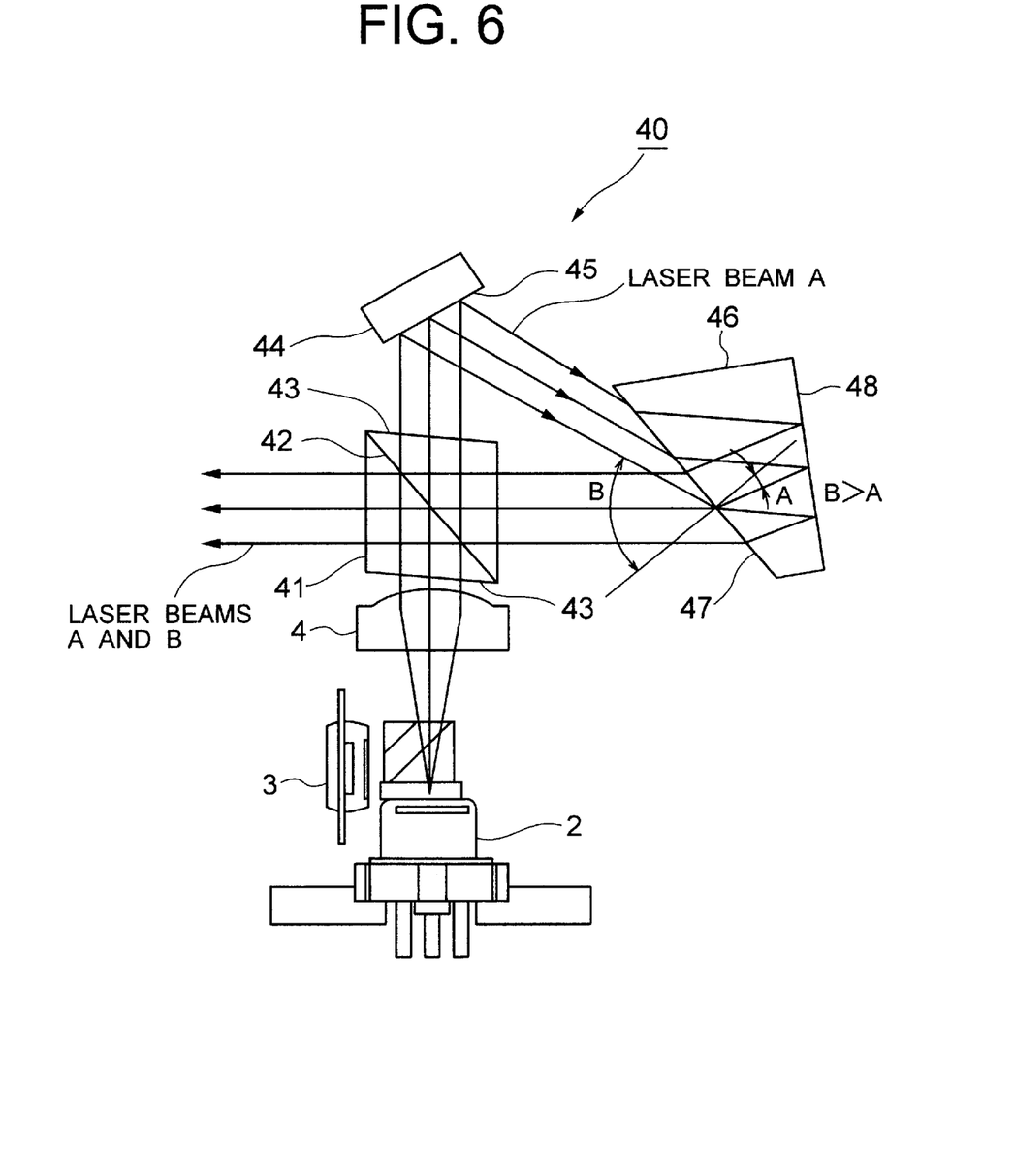
FIG. 6 is a schematic view showing another optical pickup device of the invention.

As shown in FIGS. 5 and 6, the laser beams A and B are treated in an optical system 40 between the collimator lens 4 and the objective lens 7. The optical system 40 has a four-cornered first optical member 41 including therein a first separator surface 42 operating as the wavelength selective mirror as the claimed divergence point so that the substantial whole of the laser beam A is transmitted through the first separator surface 42 and the substantial whole of the laser beam B is reflected by the first separator surface 42, and first inlet and outlet surfaces 43 through which the laser beam A proceeds from the collimator 4 to a second optical member 44 including a reflection surface 45 reflecting the laser beam A toward a third optical member 46. The third optical member 46 is substantially three-cornered and has a refraction surface 47 at which the cross sectional shape or the Far Field Pattern of the laser beam A is changed from the oval toward the circle by the beam shaping ratio determined by an angle B between a direction in which the laser beam A proceeds into the refraction surface 47 and a direction perpendicular to the refraction surface 47 and a refraction angle of the laser beam A at the refraction surface 47. Therefore, the third optical member 46 operates as an anamorphic prism for the laser beam A.

The laser beam A of circular cross section shape is reflected by a third reflection surface 48 to the refraction surface 47. Since an angle A between a direction in which the laser beam A returns to the refraction surface 47 and the direction perpendicular to the refraction surface 47 is small, the circular cross section shape of the laser beam A is kept when the laser beam A proceeds into the first optical member 41. The laser beam A proceeds out of the first optical member 41 along a common axis with the laser beam B from the first separator surface 42 operating as the wavelength selective mirror as the claimed confluence point so that the substantial whole of the laser beam A is transmitted through the first separator surface 42 and the substantial whole of the laser beam B is reflected by the first separator surface 42. The laser beams A and B of parallel rays proceed toward the objective lens 7 along a common optical axis while the cross sectional shape of the laser beam A is substantially circular. The laser beams A and B is deflected perpendicularly by a mirror (not shown) between the objective lens 7 and the aperture filter 6 to be directed to the objective lens 7.

The first inlet surface 43 facing to the collimator 4 is prevented from extending perpendicularly to the laser beams A and B so that a portion of the laser beam A or B reflected by the first inlet surface 43 is restrained from returning to the optical unit 2. Therefore, the first optical member 41 does not need to have non-reflection or light beam absorbing layer on the first inlet surface 43.

What is claimed is:

1. An optical pickup device for emitting at least two laser beams whose wavelengths are different from each other to be suitable for respective optical recording mediums, either of which optical recording mediums is selectively operated on an optical disk driver so that a signal is read out from and/or recorded onto the selected one of the optical recording mediums, the optical pickup device comprising:

a light beam source that generates the laser beams;

an objective lens that focuses the laser beams on respective recording surfaces of the optical recording mediums;

an upstream common optical path that passes, along a common optical axis thereof, the laser beams from the light beam source;

a downstream common optical path for that passes, along a common optical axis thereof, the laser beams toward the objective lens;

a pair comprising a divergence point and a confluence point between the upstream and downstream common optical paths, at which divergence point the laser beams from the upstream common optical path diverge from each other, and at which confluence point the laser beams converge into the downstream common optical paths; and an anamorphic system arranged between the divergence point and confluence point along one of the laser beams that changes a cross-sectional shape of the one of the laser beams from an oval to a circle.

2. An optical pickup device according to claim 1, wherein the divergence point and confluence point are prevented from being separated away from each other so that the one of the laser beams proceeds from the divergence point to the confluence point to form a closed loop on which the anamorphic system is arranged.

3. An optical pickup device according to claim 1, wherein the divergence point and confluence point are separated away from each other so that the one of the laser beams and another of the laser beams proceed in parallel from the divergence point to the confluence point.

4. An optical pickup device according to claim 1, wherein the anamorphic system that changes the cross-sectional shape of the one of the laser beams is prevented from changing a cross-sectional shape of another one of the laser beams.

5. An optical pickup device according to claim 1, wherein the divergence point includes a wavelength selective element that separates the laser beams away from each other on the basis of a difference in wavelength between the laser beams.

6. An optical pickup device according to claim 5, wherein the wavelength selective element is a wavelength selective mirror.

7. An optical pickup device according to claim 6, wherein the wavelength selective mirror allows the one of the laser beams to be transmitted through the wavelength selective mirror so that the one of the laser beams is introduced to the anamorphic system.

8. An optical pickup device according to claim 1, further comprising a collimator on the upstream common optical path to convert non-parallel rays of each of the laser beams to parallel rays thereof.

9. An optical pickup device according to claim 1, wherein the confluence point includes a wavelength selective mirror that allows the laser beams to be introduced to the downstream common optical path.

10. An optical pickup device according to claim 9, wherein the wavelength selective mirror allows the one of the laser beams to be transmitted through the wavelength selective mirror so that the one of the laser beams from the anamorphic system is introduced to the downstream common optical path.

11. An optical pickup device according to claim 1, further comprising a one-piece optical element on which the divergence point and confluence point and the anamorphic system are formed so that the one of the laser beams is prevented from passing through a gaseous atmosphere between the divergence point and the confluence point.

12. An optical pickup device according to claim 1, further comprising a one-piece optical element on which the divergence point and the confluence point are formed at the same position so that another one of the laser beams is prevented from passing through a gaseous atmosphere between the divergence point and the confluence point.

13. An optical pickup device according to claim 1, further comprising a single wavelength selective mirror that is operable as both the divergence point and the confluence point.

14. An optical pickup device according to claim 1, wherein the divergence point is exposed to a gaseous atmosphere through which the laser beams reach the divergence point.

15. An optical pickup device according to claim 1, further comprising an optically transparent element covering the divergence point so that the laser beams are allowed to reach the divergence point through the optically transparent element.

16. An optical pickup device according to claim 15, wherein a surface of the transparent element for receiving the laser beams directed toward the divergence point is prevented from extending perpendicularly to the laser beams proceeding into the transparent element from the light beam source.

17. An optical pickup device according to claim 1, further comprising an anamorphic element on which the anamorphic system is formed, wherein a surface of the anamorphic element for receiving the one of the laser beams to form the anamorphic system is exposed to a gaseous atmosphere so that the one of the laser beams reaches the surface of the anamorphic element through the gaseous atmosphere.

18. An optical pickup device according to claim 17, wherein an angle between the one of the laser beams to be taken into the anamorphic element and a direction perpendicular to the surface of the anamorphic element is larger than an angle between the one of the laser beams to be returned to the surface of the anamorphic element and the direction perpendicular to the surface of the anamorphic element.

19. An optical pickup device according to claim 1, wherein the one of the laser beams proceeds through a gaseous atmosphere between the anamorphic system and each of the divergence point and the confluence point.

20. An optical disk driver for reading out a signal from and/or recording the signal onto a selected one of optical recording mediums to which laser beams whose wavelengths are different from each other, to be suitable respectively for the optical recording mediums, are emitted respectively, the optical disk driver comprising:

a light beam source that generates the laser beams;

an objective lens that focuses the laser beams on respective recording surfaces of the optical recording mediums;

upstream common optical path that passes, along a common optical axis thereof, the laser beams from the light beam source;

a downstream common optical path that passes, along a common optical axis thereof, the laser beams toward the objective lens;

a pair comprising a divergence point and a confluence point between the upstream and downstream common optical paths, at which divergence point the laser beams from the upstream common optical path diverge from each other, and at which confluence point the laser beams converge into the downstream common optical path; and an anamorphic system arranged between the divergence point and confluence point along one of the laser beams that changes a cross-sectional shape of the one of the laser beams from an oval toward a circle.

21. An optical pickup device according to claim 1, wherein the cross-sectional shape of the one of the laser beams is changed from the oval to a substantial circle.

22. An optical pickup device according to claim 20, wherein the cross-sectional shape of the one of the laser beams is changed from the oval to a substantial circle.

* * * * *